US011288324B2

(12) United States Patent
Shekhar et al.

(10) Patent No.: US 11,288,324 B2
(45) Date of Patent: Mar. 29, 2022

(54) CHART QUESTION ANSWERING

(71) Applicant: ADOBE INC., San Jose, CA (US)

(72) Inventors: Sumit Shekhar, Bengaluru (IN);
Ritwick Chaudhry, Pittsburgh, PA (US); Utkarsh Gupta, Delhi (IN);
Prann Bansal, Faridkot (IN); Ajay Shridhar Joshi, Pune (IN)

(73) Assignee: ADOBE INC., San Jose, CA (US)

( * ) Notice: Subject to any disclaimer, the term of this patent is extended or adjusted under 35 U.S.C. 154(b) by 114 days.

(21) Appl. No.: 16/749,044

(22) Filed: Jan. 22, 2020

(65) Prior Publication Data

US 2021/0224332 A1 Jul. 22, 2021

(51) Int. Cl.
G06F 17/00 (2019.01)
G06F 16/903 (2019.01)
G06F 16/9032 (2019.01)
G06N 3/08 (2006.01)

(52) U.S. Cl.
CPC .. *G06F 16/90344* (2019.01); *G06F 16/90328* (2019.01); *G06F 16/90332* (2019.01); *G06N 3/08* (2013.01)

(58) Field of Classification Search
CPC ......... G06F 16/90344; G06F 16/90328; G06F 16/90332; G06F 16/3329; G06F 16/538; G06F 16/338; G06N 3/08; G06N 3/0445; G06N 3/0454
See application file for complete search history.

(56) References Cited

U.S. PATENT DOCUMENTS

| 5,802,539 | A | * | 9/1998 | Daniels | G06F 40/166 715/236 |
| 8,825,693 | B2 | * | 9/2014 | Boyce | G06F 40/279 707/765 |
| 10,754,851 | B2 | * | 8/2020 | Cohen | G06K 9/18 |
| 2019/0228099 | A1 | * | 7/2019 | Bajaj | G06N 3/08 |
| 2020/0175046 | A1 | * | 6/2020 | Wang | G06K 9/00664 |

OTHER PUBLICATIONS

He, et al., "Mask R-CNN", Facebook AI Research (FAIR), arXiv:1703.06870v3 [cs.CV] Jan. 24, 2018, 12 pages.

(Continued)

*Primary Examiner* — Greta L Robinson
(74) *Attorney, Agent, or Firm* — F. Chau & Associates, LLC

(57) ABSTRACT

A method, apparatus, and non-transitory computer readable medium for chart question answering are described. The method, apparatus, and non-transitory computer readable medium may receive a text query about a chart, identify a plurality of chart elements in the chart, associate a text string from the text query with corresponding chart elements from the plurality of chart elements, replace the text string in the text query with arbitrary rare words based on the association to produce an encoded query, generate an embedded query based on the encoded query, generate an image feature vector based on the chart, combine the embedded query and the image feature vector to produce a combined feature vector, compute an answer probability vector based on the combined feature vector, and provide an answer to the text query based on the answer probability vector.

20 Claims, 8 Drawing Sheets

(56) References Cited

OTHER PUBLICATIONS

Kafle, et al., "DVQA: Understanding Data Visualizations Via Question Answering", Rochester Institute of Technology, Adobe Research, arXiv:1801.08163v2 [cs.CV] Mar. 29, 2018, 16 pages.
Kahou, et al., "Figureqa: An Annotated Figure Dataset for Visual Reasoning", Workshop track—ICLR 2018, arXiv:1710.07300v2 [cs.CV] Feb. 22, 2018, 20 pages.
Kazemi, et al., "Show, Ask, Attend, and Answer: A Strong Baseline for Visual Question Answering", Google Research, arXiv:1704.03162v2 {cs.CV] Apr. 12, 2017, 7 pages.
Pennington, et al., "Glove: Global Vectors for Word Representation", Computer Science Department, Stanford University, Stanford, CA, 12 pages.
Siegel, et al., "Figureseer: Parsing Result-Figures in Research Papers", Allen Institute for Artificial Intelligence, University of Washington, 16 pages.
Yang, et al., "Stacked Attention Networks for Image Question Answering", Carnegie Mellon University, Microsoft Research, Redmond, WA, arXiv:1511.02274v2 [cs.LG] Jan. 26, 2016, 11 pages.

* cited by examiner

CHART QUESTION ANSWERING

BACKGROUND

The following relates generally to text and image processing, and more specifically to chart question answering.

A chart is a visual way to organize and represent data. Using charts can be an effective way of communicating important aspects of the data in an efficient way. Therefore, a user may be able to quickly answer important questions about the data by referencing the chart.

In some cases, computer systems may be configured to process and interpret charts automatically. However, these systems may be limited to answering questions that used a limited fixed vocabulary, or that refer to simple charts. As a result, these systems may not be useful for obtaining data or answering questions about complex charts, or charts that use unknown vocabulary. Therefore, there is a need in the art for improved computer systems for answering questions about charts and figures.

SUMMARY

A method, apparatus, and non-transitory computer readable medium for chart question answering are described. Embodiments of the method, apparatus, and non-transitory computer readable medium may replace a text string in a text query with an arbitrary rare word to produce an encoded query, wherein the text query relates to a chart and the text string is replaced based at least in part on an association between the text string and a chart element of the chart, generate a combined feature vector based at least in part on the encoded query, compute an answer probability vector based on the combined feature vector, and provide an answer to the text query based on the answer probability vector.

Another method, apparatus, and non-transitory computer readable medium for chart question answering are described. Embodiments of the method, apparatus, and non-transitory computer readable medium may receive a text query about a chart, wherein the chart comprises a plurality of chart elements, replace at least one text string in the text query with an arbitrary rare word based at least in part on the chart elements, generate an answer to the text query based on the text query; generate visual answer interpretation information based on an associated between the answer and the chart elements; and provide the answer and the visual answer interpretation information to the user.

An apparatus for chart question answering is described. Embodiments of the apparatus may include a chart parser configured to identify a plurality of chart elements in the chart, an encoder configured to replace at least one text string in the text query with a rare word from a fixed word embedding dictionary, a text embedding component configured to generate an embedded query based at least in part on the rare word; and a decoder configured to compute an answer probability vector based on the embedded query.

DETAILED DESCRIPTION

Figure 1:
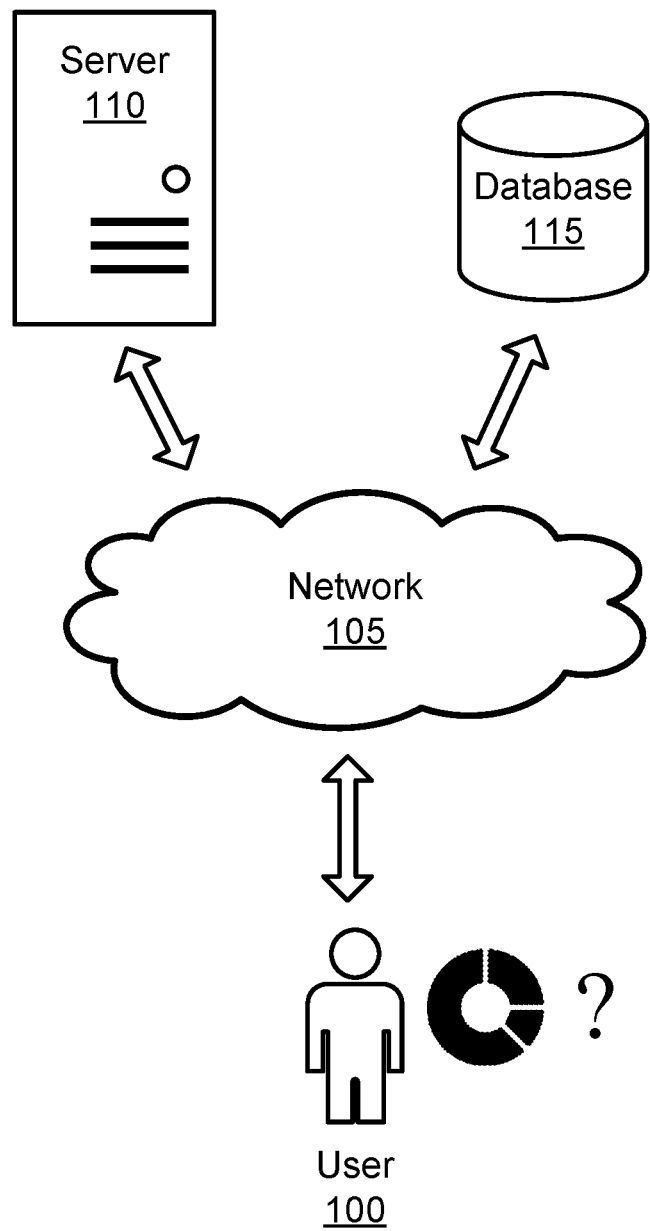
FIG. 1 shows an example of a system for chart question answering according to aspects of the present disclosure.

Embodiments of the present disclosure provide systems and methods for answering questions or obtaining data from charts and figures. Charts are a common way of organizing and communicating information. The manner in which charts are organized can help human viewers quickly glean important information. Machine learning techniques can also be used to obtain information from, and answer questions about, charts and figures.

However, charts can be challenging for automated systems to process. Challenges for automated question answering include 1) answering questions based on a large variety of data charts (e.g., bar charts, pie charts, pie charts, line charts, and scatter plots), 2) deriving answers from the chart vocabulary, 3) associating the answer with elements of the chart structure to provide a more meaningful answer, and 4) incorporating both visual and textural elements of a chart into the answer.

Conventional techniques include neural networks trained using FigureQA, visual question answering (VQA) or data visualization question answering (DVQA) training sets. These systems are limited to answering questions about a fixed vocabulary, about a certain subset of chart types, or within a limited set of answers (i.e., limited to yes or no answers). Furthermore, conventional techniques may not incorporate elements of the underlying charts structure in the answer (i.e., they may only utilize textual data found in a chart), and they may not provide any means of identifying an answer with specific chart elements to produce interpretable reasoning about the answers.

Due to these limitations, conventional techniques are not suitable for many complex charts or queries. For example, conventional techniques may not be able to answer questions that reference multiple pieces of information in different parts of a complex chart. As an example, if a bar chart provides the population of various states, one relevant question might be "does Minnesota or Wisconsin have a higher population?" However, the terms "Minnesota" and "Wisconsin" may not exist in the fixed vocabulary that a conventional chart question answering system uses to interpret queries. This may prevent the system from providing a meaningful answer, even if the answer to the question is easily identifiable based on the relative size of the bars labeled "Minnesota" and "Wisconsin."

Therefore, the present disclosure describes systems and methods for answering complex questions about a wide variety of charts, without a fixed vocabulary. The systems and methods described herein enable encoding of questions and answers in a way that connects the questions and answers to elements of the chart, and generates masks for these elements. Therefore, embodiments of the disclosure can provide a connection between the answers and elements of the charts to enable reasoning about the answers.

Embodiments of the disclosure use "rare words" from a known vocabulary to answer a query about words that appear in a chart. Unknown words in the query may be replaced with the rare words prior to inputting the query into a machine learning model. This method leverages the fact that in many charts, the semantic meaning of words in the chart elements is not as important as the relationships between the elements for answering questions about the chart. Thus, replacing query text with arbitrary rare words can enable processing of the text with machine learning models that utilize a vector representation of words based on a known vocabulary, but without restricting query text to that vocabulary.

Consider the previously presented example query of "does Minnesota or Wisconsin have a higher population?" Even without knowing the meaning of the terms "Minnesota" and "Wisconsin," embodiments of the present disclosure may provide the correct answer to the question by replacing the terms with rare words (e.g., "wainscot," and "magnifico,") that do exist in the fixed vocabulary. The rare terms are associated specific chart elements where the original terms appear, and then a correct answer is provided using a combination of image recognition and text recognition networks, along with the relationship between the terms and chart elements.

Some embodiments also enable reasoning about the generated answers by identifying and providing a visual indication of the chart elements where the answers appear. Thus, a question answering system may provide users with visual information about the source of the answer. This can enable a human user to quickly verify and understand the output of the automated question answering system.

The following terms are used throughout the present disclosure.

The term "rare word" refers to a word that appears in a known dictionary of words that have been transformed into a vector representation, but which is not commonly used. For example, rare words may be drawn from a dictionary of words drawn from, for example, a pretrained Global Vectors (GloVe) word embedding model. Words in a query that do not have a vector representation may be replaced with arbitrary rare words, because having a correct semantic meaning of the query words may not be necessary to answer questions about a chart. Examples of rare words may include words such as "wainscot", "magnifico", and "picador."

The term "encoded query" refers to query text that has been modified by replacing certain terms found in the query with the rare words. For example, the query "does Minnesota or Wisconsin have a higher population?" may become the encoded query "does wainscot or magnifico have a higher picador?" if the query terms "Wisconsin," "Minnesota," and "population" are replaced with "wainscot," "magnifico," and "picador." Each of the rare words may correspond to one or more elements identified in a chart. The semantic meaning of the encoded query may not be important to answering the question based on the chart as long as the correspondence is known.

The term "embedded query" refers to the output of a machine learning model that takes the encoded query as input. The embedded query may take into account both the vector representation of words in the encoded query as well as the structure of the query (i.e., word order and syntax).

The term "image feature vector" refers to the output of a machine learning model trained to identify features of an image. The image feature vector may be combined with the embedded query into a single input vector prior to being used as input into a decoder.

The term "answer probability vector" refers to the output of a decoder that has a number of dimensions corresponding to elements of the original chart (which have been replaced with rare words in the encoded query), common answer words (e.g., "yes," "no," "not available", etc.) and generic chart terms (e.g., for questions about the type of chart). An answer to the query can then be selected based on, for example, which dimension of answer probability vector has the highest value.

System Overview

FIG. 1 shows an example of a system for chart question answering according to aspects of the present disclosure. The example shown includes user 100, network 105, question answering server 110, and database 115. Question answering server 110 may be an example of, or include aspects of, the corresponding element described with reference to FIG. 8.

A user 100 may provide a query about a chart to the question answering server 110 via network 105. In some examples, the user provides the chart, and in other examples, the chart is located online, for example, stored in the database 115. The database 115 may also store information such as a known vocabulary of words having a vector representation. Rare words from this vocabulary may be used to encode the query from the user 100. The encoded query may then be further processed by the question answering server 110 to provide the user 100 with an answer to the query.

In some cases, the question answering server 110 may provide interpretable reasoning aids to the user 100, such as a visual indication of which elements of the chart provide the source of the answer to the query.

Figure 2:
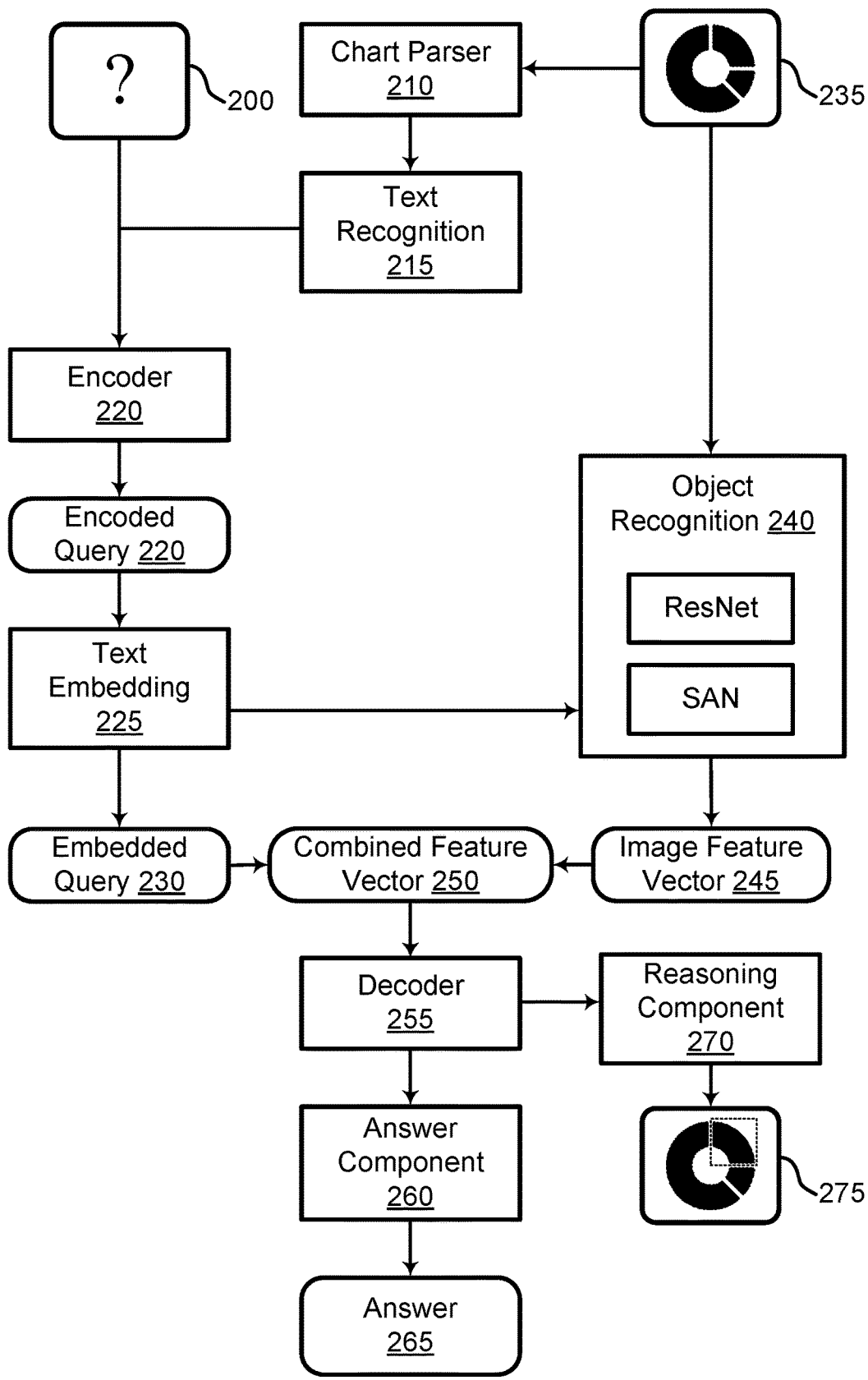
FIGS. 2 through 3 show examples of a process for chart question answering according to aspects of the present disclosure.

FIG. 2 shows an example of a process for chart question answering according to aspects of the present disclosure. The example shown includes query 200, chart 205, chart parser 210, text recognition component 215, encoder 220, encoded query 225, text embedding component 230, embedded query 235, object recognition component 240, image feature vector 245, combined feature vector 250, decoder 255, answer component 260, answer string 265, reasoning component 270, and answer interpretation 275.

Query 200 and chart 205 may be provided as input to a question answering system, whereas answer string 265 (and, in some cases, answer interpretation 275) is provided as output.

Chart parser 210 identifies a set of chart elements in the chart 205. In some cases, chart parser 210 may also detect an element order for at least one of the chart elements (e.g., title, legend, axis labels, etc.). In some examples, the set of chart elements are identified using neural network including a Convolutional Neural Network (CNN), such as a Region Convolutional Neural Network (R-CNN), a Mask R-CNN, a Fast/Faster R-CNN, or any other detector suitable for detecting chart elements.

Text recognition component 215 performs text recognition on the set of chart elements. For example, text recognition component 215 may identify text in from elements of the chart (e.g., title, axis labels, etc.) and associate a text string from the text query 200 with corresponding chart elements from the set of chart elements. Text recognition component 215 may identify the text string based on the text recognition. In some examples, the text recognition is performed using an oracle or an automated Optical Character Recognition (OCR).

Encoder 220 replaces a text string in the text query 200 with arbitrary rare words based on the association to produce an encoded query 225. In some examples, the rare words include rarely used words from a GloVe dictionary (or a word2Vec dictionary, or any other suitable dictionary of words with vector representations). By replacing query text with rare words from a known vocabulary, the encoder 220 may process queries having an unlimited vocabulary, and leverage the relationship between the terms in the chart elements to identify the context of the words, regardless of their semantic content.

That is, questions and answers about charts commonly contain words that are not included in a pre-determined vocabulary of vector representations. Thus, in embodiments of the present disclosure leverage the words detected (e.g. by the chart parser and text recognition component) are replaced with rare words that already exist in the dictionary. The specific rare word to substitute the word in the question may be obtained from a mapping between Element type/ Element order and a fixed set of rare words (see Table 1 below). The Element type/Element order tuples for a given chart are generated using a designed protocol. The answer dictionary is encoded in terms of the detected elements to allow answers to be words present in the charts.

In some cases, the replacing the text string is based on the element order. For example, particular elements of the chart may be associated with the rare words, and text strings found in the query may be replaced based on the association between the words and the chart element that includes the words. In some cases, the encoder may replace words in the query with a vector representations based on the predetermined dictionary.

Text embedding component 230 generates an embedded query 235 based on the encoded query 225. In some examples, the embedded query 235 is generated using a Long Short Term Memory (LSTM) neural network. For example, text embedding component 230 may be configured to generate an embedded query 235 based at least in part on the rare words. The output of the text embedding component 230 may incorporate both semantic and structural information from the encoded query.

Object recognition component 240 generates an image feature vector 245 based on the chart 205. In some examples, the image feature vector 245 is generated using a ResNet neural network, a Spatial Attention Network (SAN), or both.

Decoder 255 combines the embedded query 235 and the image feature vector 245 to produce a combined feature vector 250 and computes an answer probability vector based on the combined feature vector 250. In some cases, decoder 255 may provide the combined feature vector 250 to a fully connected neural network and apply a softmax function to compute a probability vector. In some cases, the embedded query 235 and the image feature vector 245 are combined prior to being input to the decoder 255. Thus, decoder 255 may be configured to compute an answer probability vector based on the embedded query 235 and the image feature vector 245.

Answer component 260 provides an answer to the text query 200 based on the answer probability vector. Answer component 260 may also associate the dimensions of the answer probability vector with the text string, the set of chart elements, chart types, common answer words, or any combination thereof. In some examples, the answer is based on a dimension of the answer probability vector with a highest value.

Reasoning component 270 identifies a chart element corresponding to the answer. Reasoning component 270 may also generate answer interpretation 275 information based on the identified chart element. In some cases, reasoning component 270 may generate visual answer interpretation 275. Reasoning component 270 may also provide the answer and the visual answer interpretation 275 information to the user.

As described further below, a question answering server 110 of FIG. 1 may include artificial neural network components in the chart parser 210, text recognition component 215, encoder 220, text embedding component 230, object recognition component 240, decoder 255, answer component 260. These components are provided as examples, and the overall network architecture of the question answering server 110 may include other machine learning components.

According to various embodiments, the machine learning components of a question answering server 110 may be trained using a data set such as the FigureQA, visual question answering (VQA) or data visualization question answering (DVQA) training sets. In another embodiment, machine learning components may be trained using a novel training set such as a Locate, Encode & Attend for Figure Question Answering (LEAF-QA) dataset.

The LEAF-QA dataset includes over 200,000 chart images, 1.5 million questions and 2 million answers (in some cases, a single question may have more than one answer). It includes approximately 12,000 distinct answers, which is higher than previous datasets used for training conventional question answering systems.

From the question answering dataset, a subset of testing images may be selected (e.g., around 40,000 images from the LEAF-QA dataset, corresponding to 300,000 questions and 400,000 answers). A smaller testing set generated from data that is not included in the training set may also be used to test the generalization of the question answering models.

Question Answering Process

Figure 3:
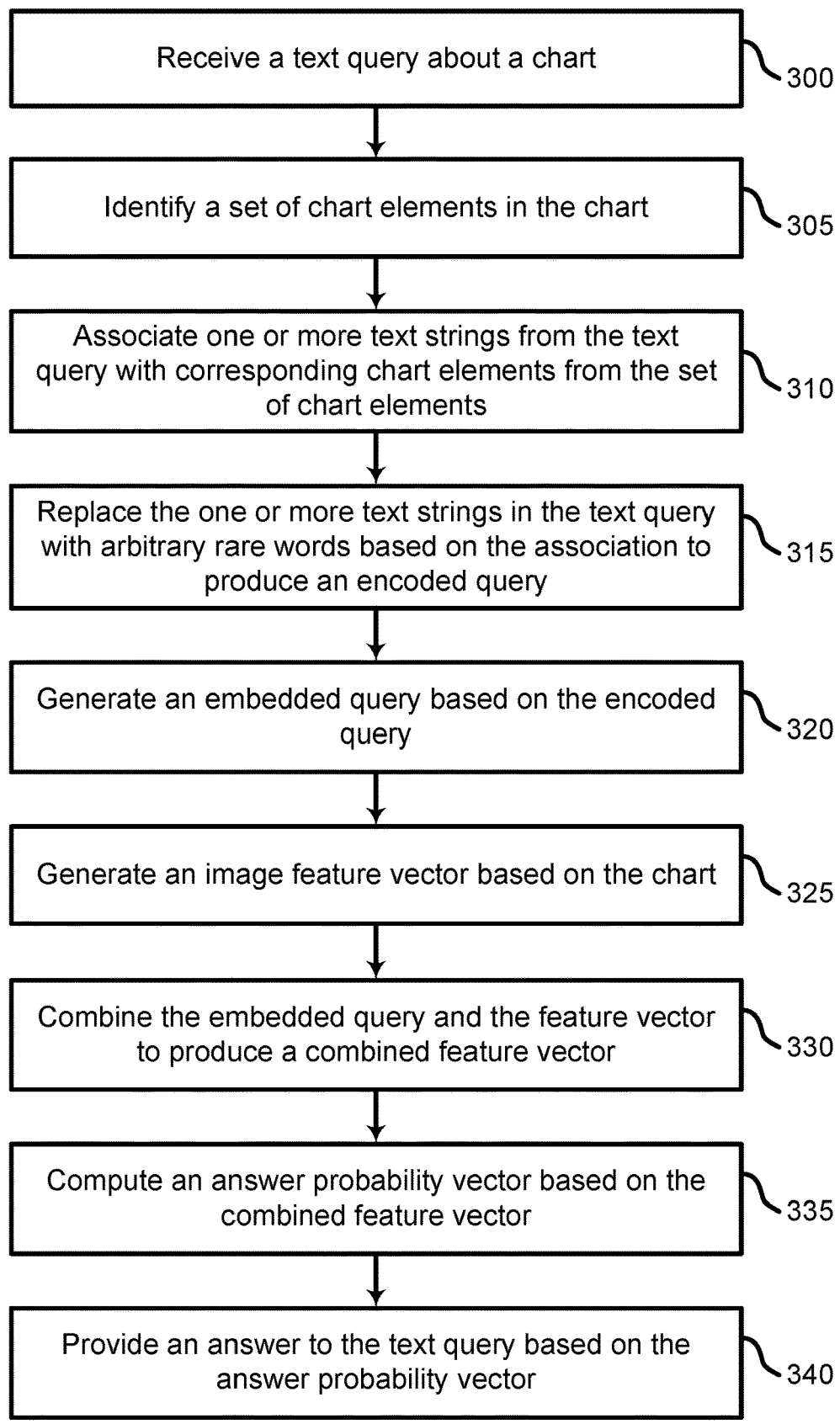

FIG. 3 shows an example of a process for chart question answering according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 300, the system receives a text query about a chart. The query may come from a human user, or it may be automatically generated. In some cases, the query comes from a library that includes charts and questions about the charts. In some cases, the operations of this step may be performed by a query component as described with reference to FIG. 8.

At operation 305, the system identifies a set of chart elements in the chart. For example, the elements may include legend elements, labels from the x-axis or y-axis, components or labels of a pie chart, bars, line segments, etc. In some cases, the operations of this step may be performed by a chart parser as described with reference to FIGS. 2 and 8. Further detail regarding operation 305 is described with reference to FIG. 4.

At operation 310, the system associates a text string from the text query with corresponding chart elements from the set of chart elements. That is, text from the query may be detected in one or more of the chart elements (e.g., in the legend or along an axis). In some cases, the operations of this step may be performed by a text recognition component as described with reference to FIGS. 2 and 8.

At operation 315, the system replaces the text string in the text query with rare words based on the association to produce an encoded query. In some cases, the rare words are pre-selected and associated with chart elements (i.e., classes) in advance. By replacing query text with rare words, the system may process charts that include unknown words using machine learning tools that were trained on a limited vocabulary. In some cases, the query is encoded in a vector representation based on the replaced words. In some cases, the operations of this step may be performed by an encoder as described with reference to FIGS. 2 and 8. Further detail regarding operations 310 and 315 is described with reference to FIG. 5.

At operation 320, the system generates an embedded query based on the encoded query. The embedded query may be in the form of a vector that incorporates both semantic and structural information from the words of the encoded query. In some cases, the embedded query represents a reduced number of dimensions compared to a vector representation of the words in the encoded query. In some cases, the operations of this step may be performed by a text embedding component as described with reference to FIGS. 2 and 8. At operation 325, the system generates an image feature vector based on the chart. In some cases, the operations of this step may be performed by an object recognition component as described with reference to FIGS. 2 and 8.

At operation 330, the system combines the embedded query and the image feature vector to produce a combined feature vector. For example, the combined feature vector may be formed by concatenating the embedded query and the image feature vector. In some cases, the operations of this step may be performed by a decoder as described with reference to FIGS. 2 and 8.

At operation 335, the system computes an answer probability vector based on the combined feature vector. For example, the answer probability vector may be produced by applying a softmax function to the output of a fully connected neural network that takes the combined feature vector as input. In some cases, the operations of this step may be performed by a decoder as described with reference to FIGS. 2 and 8.

At operation 340, the system provides an answer to the text query based on the answer probability vector. In some cases, the operations of this step may be performed by an answer component as described with reference to FIGS. 2 and 8. Further detail regarding operations 320 to 335 is described with reference to FIG. 6.

Chart Parsing

Figure 4:
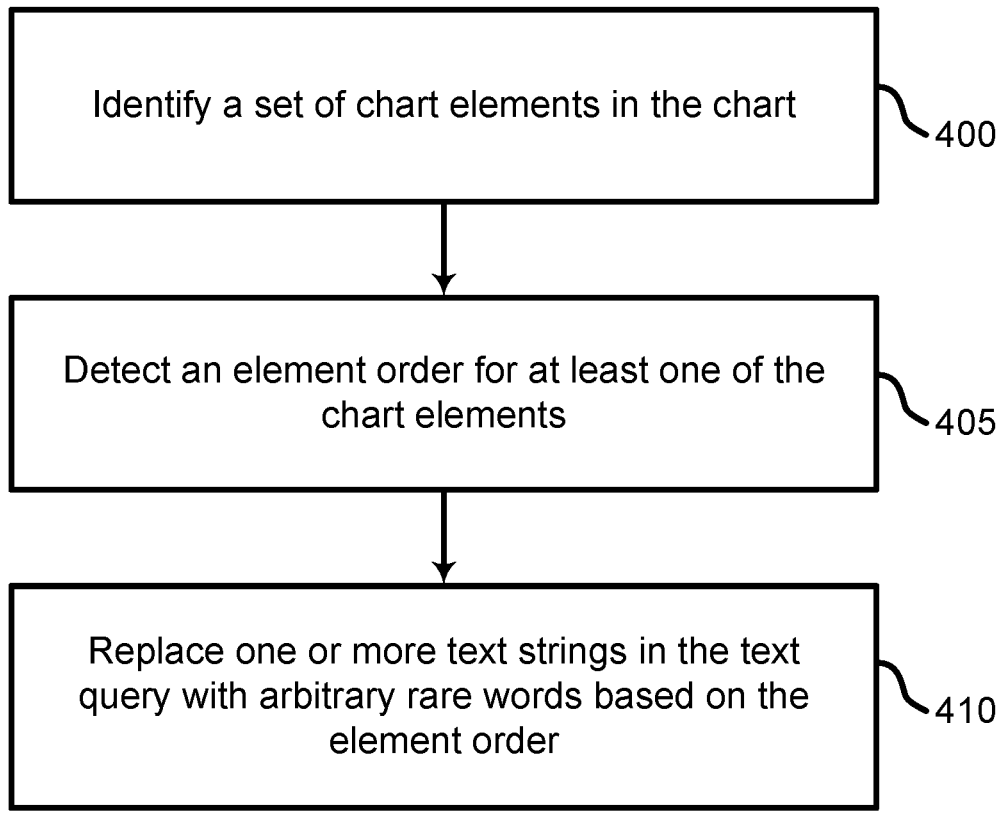
FIG. 4 shows an example of a process for parsing a chart image according to aspects of the present disclosure.

FIG. 4 shows an example of a process for parsing a chart image according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 400, the system identifies a set of chart elements in the chart. At operation 405, the system detects an element order for at least one of the chart elements. In some cases, the operations of steps 400 and 405 may be performed by a chart parser as described with reference to FIGS. 2 and 8. The detected elements can include chart elements such as X and Y axes, legend elements, bars of a bar chart, wedges in a pie chart or donut chart, or lines in a line chart.

At operation 410, the system replaces a text string in the text query with arbitrary rare words based on the element order. In some cases, the operations of this step may be performed by an encoder as described with reference to FIGS. 2 and 8.

The chart parser may detect and classify elements of the provided chart images. A training corpus, bounding boxes and masks, and class labels are fed to a neural network for optimization. The detected elements are classified according to element classes. The element classes may include text classes such as legend labels and Y-Axis titles. Element classes may also include plot elements such as pie wedges and bars.

The set of chart elements are identified using an artificial neural network (ANN) including a CNN such as an R-CNN, a Fast/Faster R-CNN, or a Mask R-CNN. In some cases, the chart parser incorporates a ResNet such as ResNet-101. A CNN is a class of neural network that is commonly used in computer vision or image classification systems. In some cases, a CNN may enable processing of digital images with minimal pre-processing.

An ANN may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

A CNN is an ANN characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

However, a standard CNN may not be suitable when the length of the output layer is variable, i.e., when the number of the objects of interest is not fixed. Furthermore, the objects of interest (i.e., the chart elements) can have different locations within the image, and may have different aspect rations. Selecting a large number of regions to analyze using conventional CNN techniques may result in computational inefficiencies. Thus, in the R-CNN approach, a finite number of proposed regions are selected and analyzed.

Fast R-CNN and Faster R-CNN provide solutions for speeding up an R-CNN. Fast R-CNN provides the original input image to the CNN to generate a feature map. From the feature map, it identifies region proposals, warps them into squares with a fixed size so they can be input into a fully connected layer. Thus, the convolution is done only once. In Faster R-CNN, a separate network is used to predict region proposals (i.e., instead of using a selective search algorithm on the feature map). The predicted region proposals are then reshaped and classified using a region-of-interest (RoI) pooling layer A Mask RCNN is another deep neural network incorporating concepts of the R-CNN. Given an image as input, the Mask R-CNN provides object bounding boxes, classes and masks (i.e., sets of pixels corresponding to object shapes). A Mask R-CNN operates in two stages. First, it generates potential regions (i.e., bounding boxes) where an object might be found. Second, it identifies the class of the object, refines the bounding box and generates a pixel-level mask in pixel level of the object. These stages may be connected using a backbone structure such as a feature pyramid network (FPN).

A ResNet is a neural network architecture that addresses issues associated with training deep neural networks. It operates by including identity shortcut connections that skip one or more layers of the network. In a ResNet, stacking additional layers doesn't degrade performance or introduce training errors because skipping layers avoids the vanishing gradient problem of deep networks. In other words, the training gradient can follow "shortcuts" through the deep network.

Query Encoding

Figure 5:
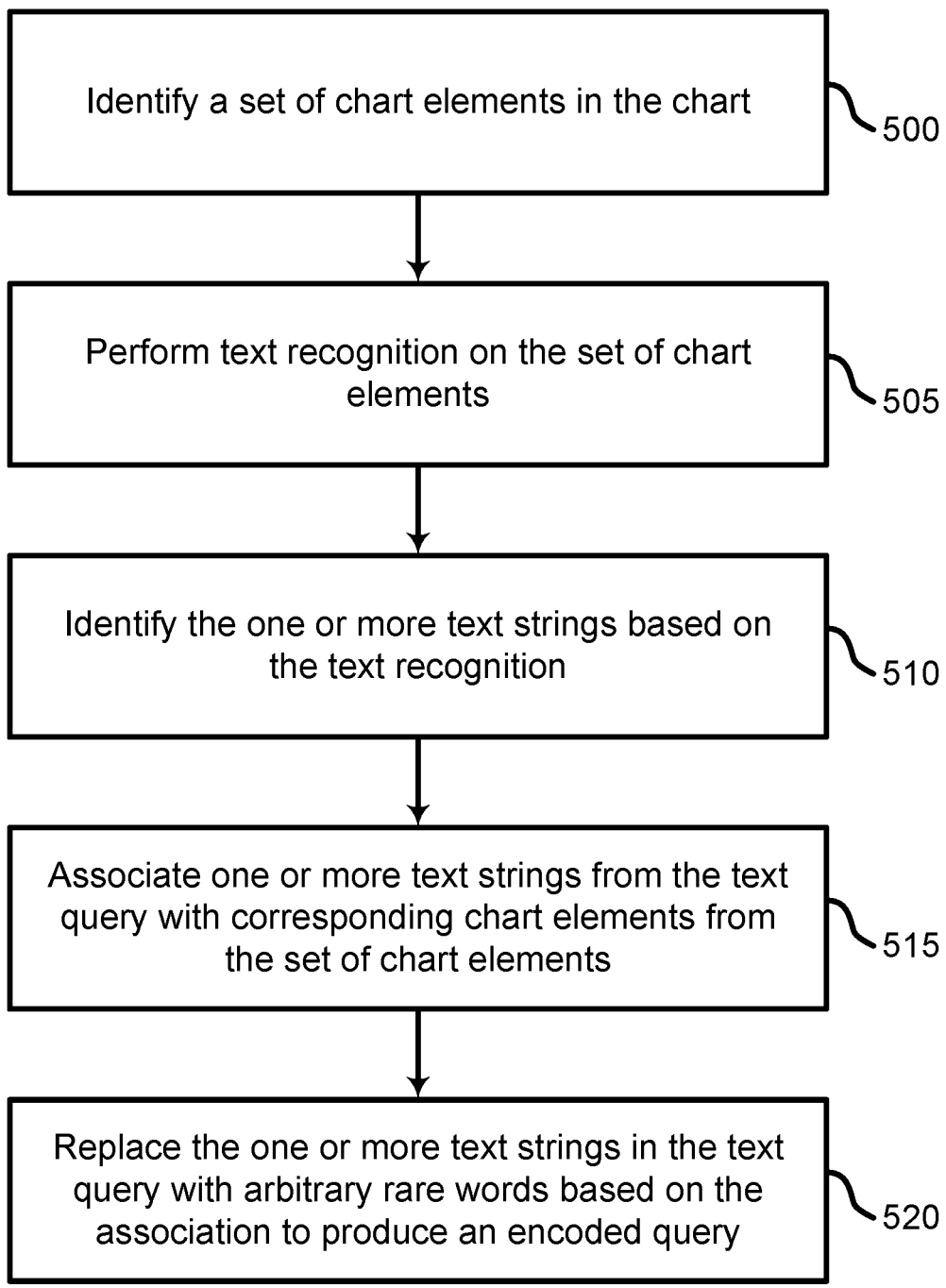
FIG. 5 shows an example of a process for query encoding according to aspects of the present disclosure.

FIG. 5 shows an example of a process for query encoding according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 500, the system identifies a set of chart elements in the chart as described above with reference to FIG. 4. In some cases, the operations of this step may be performed by a chart parser as described with reference to FIGS. 2 and 8.

At operation 505, the system performs text recognition on the set of chart elements. At operation 510, the system identifies the text string based on the text recognition. In some cases, the operations of steps 505 and 510 may be performed by a text recognition component as described with reference to FIGS. 2 and 8.

A chart parser may parse chart components corresponding to text elements and the text recognition component may process the parsed components to extract a text string. During training of the system, text strings from a ground truth box with a predetermined overlap are attached to detected elements. The text strings may be extracted through an automated optical character recognition (OCR) or an oracle, if ground truth data is available. Detected elements and detected classes (e.g., legend, x-axis, y-axis, etc.) are input to the OCR or oracle. The OCR or oracle output detected strings with associated classes.

OCR refers to the automatic conversion of typed, handwritten or printed text into machine-encoded text. OCR input may include images of documents or image scenes. OCR may provide a method of digitizing printed texts so that they can be electronically processed. Some OCR systems may also identify page elements including images, columns, and other non-textual components (i.e., the relationship between text and chart elements).

At operation 515, the system associates a text string from the text query with corresponding chart elements from the set of chart elements. For example, Text strings may be assigned a tuple (Element Type, Element Order) in the text string ordering component, where a type of element is a detected class of the text string. Consistency is maintained on a value axis of horizontal plots. The element types for x-label and y-label strings are reversed. This is determined based on variations in the horizontal and vertical lengths of the detected bars and boxes. Ordering of each text element type is performed by sorting x-labels left to right and sorting y-labels from bottom to top. The detected legend text elements may be sorted top-to-bottom, left-to-right. Pie labels and pie values may be sorted clockwise.

At operation 520, the system replaces the text string in the text query with arbitrary rare words based on the association to produce an encoded query. Thus, in the question encoding, questions for a chart are encoded in terms of extracted text strings. However, terms int eh query that are not part of the limited vocabulary of a fixed dictionary (i.e., a GloVe dictionary) used to embed the words into a vector space may be replaced with arbitrary rare words from the fixed vocabulary.

For example, the question string may be matched with the list of extracted text strings to identify a correspondence between strings. In some cases, the longest question string is first. After each positive match, the matched part of the question part is replaced by a specific rare word in a dictionary. The rare word may be pre-defined in terms of one-to-one mapping from the tuple, corresponding to the matched text string. In some cases, the operations of this step may be performed by an encoder as described with reference to FIGS. 2 and 8.

In some cases, the questions may be encoded according to a template associating chart elements, common words, and chart types with predetermined dimensions. Examples are shown in table 1:

TABLE 1

Question and Answer Encoding

| Elements | Question Rare Words | Answer Dimensions |
| --- | --- | --- |
| X-Axis Labels | jackscrew, broadtail, dysthymia, picador, bazar, squeezebox, lightship, etc. | 0-14 |
| Y-Axis Labels | enucleation, torr, relator, esophagitis, hydrogel, etc. | 15-29 |
| Legend Labels | contador, onchocerciasis, implicature, perianth, etc. | 30-44 |
| Title | marguerite | — |
| X-Axis Title | wainscot | — |
| Legend Title | magnifico | — |
| Y-Axis Title | newspeak | — |
| Common Vocabulary Answers | — | 45-64 |
| Chart Types | — | 65-74 |

Questions for each chart may be created using templates suitable for a type of chart. For example, estimating whether two data series are correlated is possible from scatter plots. In some embodiments, question templates used for the different chart types are listed in relational questions and structural questions. Additionally, questions for a given chart may contain phrases specific to a chart. Phrases may be populated in fixed placeholders in the question templates.

For each question template, paraphrases may be generated to ensure variation amongst the questions. The paraphrases are used to prevent question-answering models from memorizing templates rather than understanding the semantics of the questions. Thus, the template dimensions may differ based on the type of chart or query. Example chart types and corresponding questions are shown below in Table 2:

TABLE 2

Example Question Templates for Various Chart Types.

| Chart type | Relational Question Templates |
|---|---|
| Vertical/ Horizontal Group/Stacked Bar Graphs | Among (X/Y-Axis Label 1), (X/Y-Axis Label 2) and (X/Y-Axis Label 3) which has the lowest/ highest (Graph Title) for (Legend Title)? How many groups/stacks of bars contains at least one bar with value greater/less than (Y/X-Axis Label 1)? |
| Pie/Donut Charts | Among (Legend Label 1), (Legend Label 2) and (Legend Label 3), which is the lowest/highest (Graph Title) for (Legend Title)? Does any pie cover more than half/ quarter the circle? |
| Scatter Plots | What is the correlation between (X-Axis Title) and (Y-Axis Title)? |
| Line Graphs | How many times does (Graph Title) increase for (Legend Label)? Among (X-Axis Label 1), (X-Axis Label 2) and (X-Axis Label 3) which has the lowest/highest (Graph Title) for (Legend Label 1)? |
| Vertical/ Horizontal Box Plots | For (X/Y-Axis Label) which quartile has the minimum/maximum spread? Which (X/Y-Axis Label) has the minimum/maximum median/first quartile/third quartile? Which of the following boxes has the largest/ smallest size? |

In some cases, words identified in the query may be represented in vector form using GloVe, Word2vec, or another suitable system for word embedding. Glove and Word2vec refers to systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and sWord2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space.

Answering Generation

Figure 6:
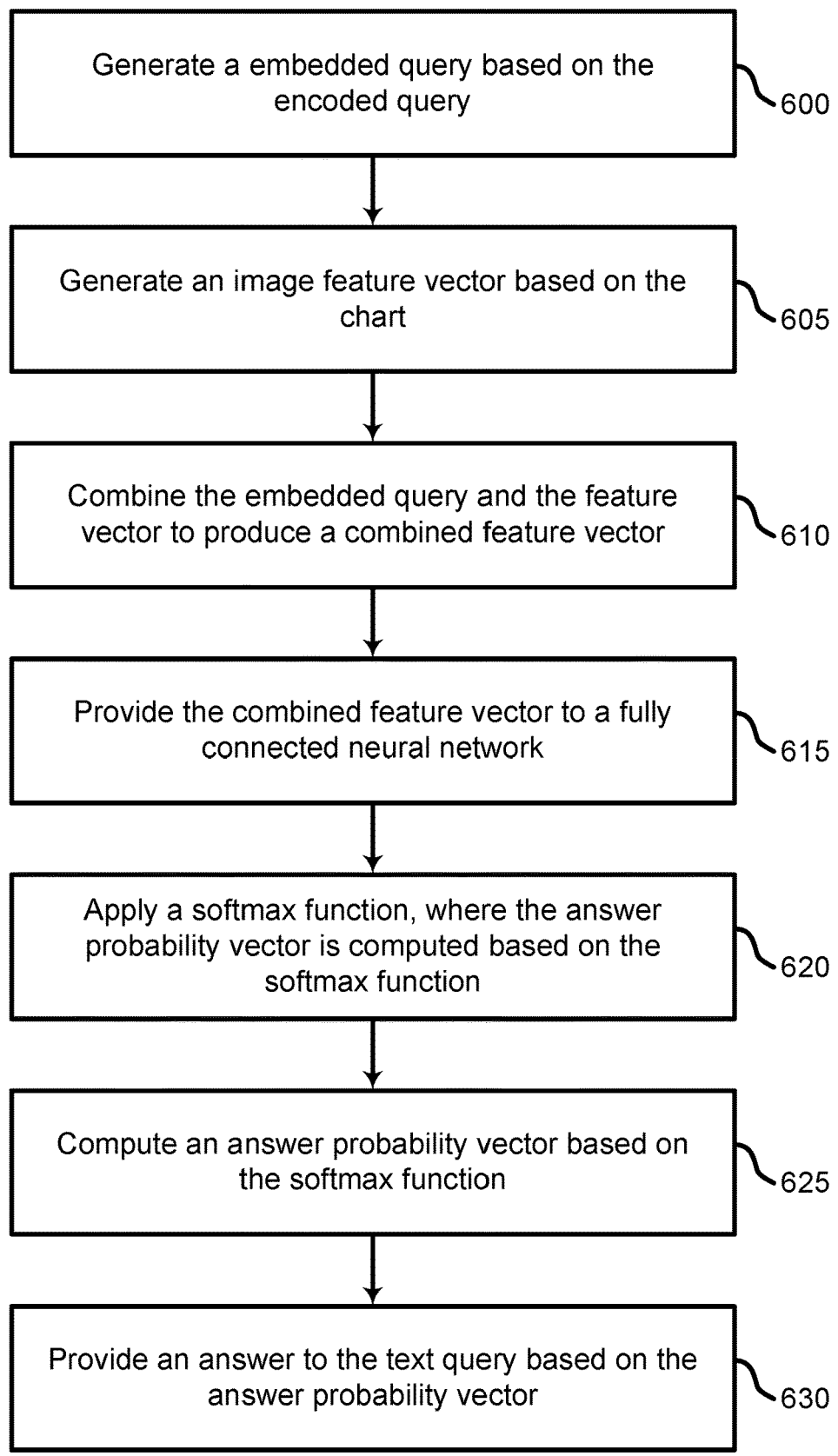
FIG. 6 shows an example of a process for chart question answering according to aspects of the present disclosure.

FIG. 6 shows an example of a process for chart question answering according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 600, the system generates an embedded query based on the encoded query. For example, the encoded question string described with reference to FIG. 5 may be fed to a text embedding component including a long-short term memory (LSTM) network.

At operation 605, the system generates an image feature vector based on the chart. In some cases, the operations of this step may be performed by an object recognition component as described with reference to FIGS. 2 and 8. The object recognition component may include a ResNet as described above and additionally or alternatively, a spatial attention network (SAN), which may be used for question answering on natural images.

In some cases, encoded question-answer pairs and chart images are used to train the attention network. The chart images are pre-processed using, for example, Resnet-152 encoding. The encoding may be concatenated with the output of the LSTM layer of question encoding, and fed to the SAN.

At operation 610, the system combines the embedded query and the image feature vector to produce a combined feature vector. In some cases, the operations of this step may be performed by a decoder as described with reference to FIGS. 2 and 8.

At operation 615, the system provides the combined feature vector to a fully connected neural network. In some cases, the cross-entropy loss between answer vector and the output of the fully connected layer is minimized using an Adam optimizer. In some cases, the operations of this step may be performed by a decoder as described with reference to FIGS. 2 and 8. In other words, the decoder may comprise a fully connected neural network.

At operation 620, the system applies a softmax function, where the answer probability vector is computed based on the softmax function. In some cases, the operations of this step may be performed by a decoder as described with reference to FIGS. 2 and 8.

At operation 625, the system computes an answer probability vector based on the softmax function. In some cases, the operations of this step may be performed by a decoder as described with reference to FIGS. 2 and 8.

At operation 630, the system provides an answer to the text query based on the answer probability vector. In some cases, the operations of this step may be performed by an answer component as described with reference to FIGS. 2 and 8.

As discussed above, the text embedding component may comprise an LSTM, which may be a form of RNN. A recurrent neural network (RNN) is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

An LSTM is an RNN that includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. For example, the relationship between words in a sentence may extend beyond words that are directly next to each other. LSTMs can help mitigate the vanishing gradient (and exploding gradient) problems when training an RNN.

The object recognition component may include a Spatial Attention Network (SAN). An SAN is a variant of a CNN designed to exploit the spatial context of images. A SAN utilizes attention weights for clustered regional features. The attention weights indicate the value of the contribution of different regions to the overall classification. In some cases, an SAN uses a weighted sum of regional features as discriminative features. Thus, an SAN draws attention to important contents by giving them a higher attention weight.

Interpretable Reasoning

Figure 7:
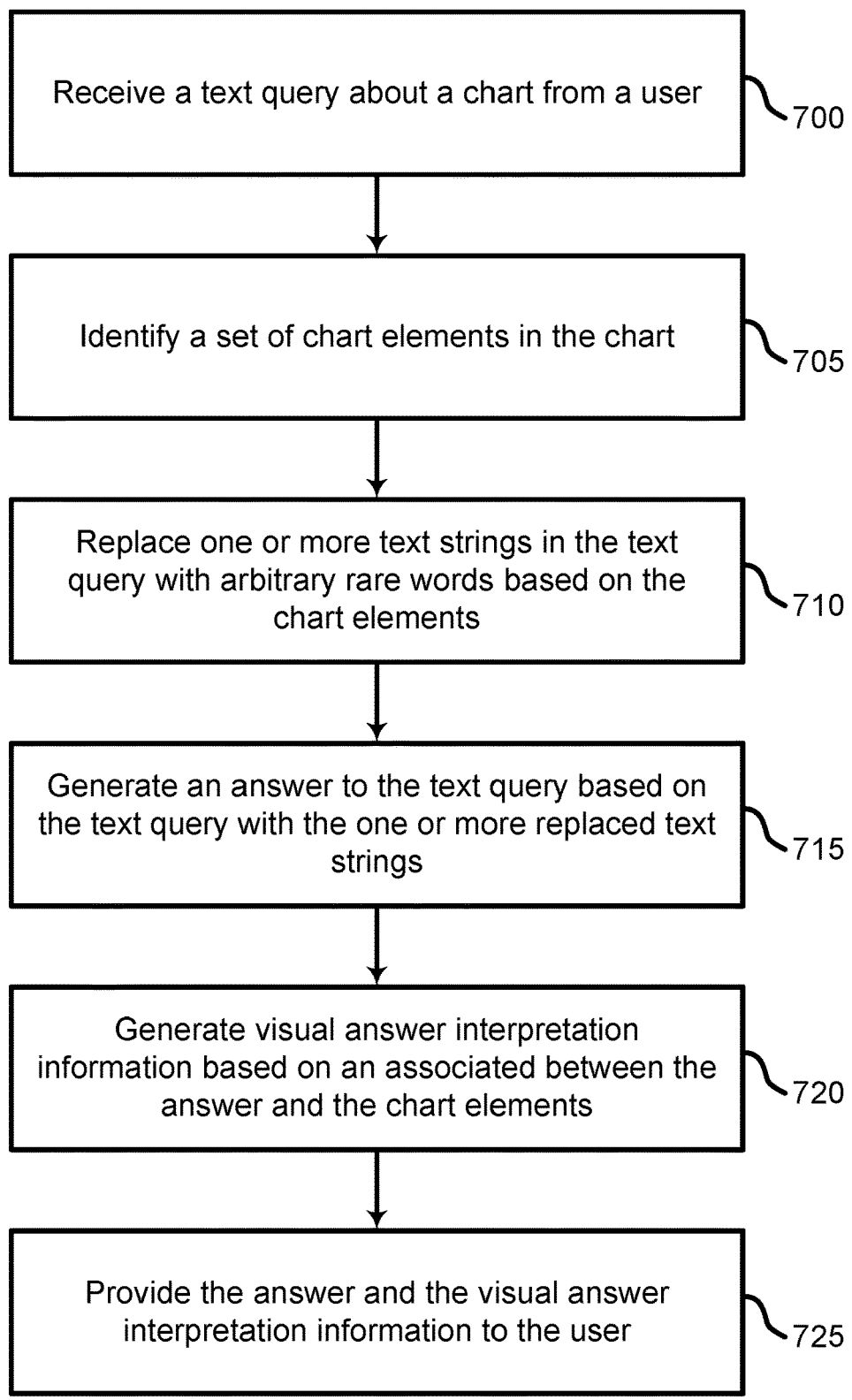
FIG. 7 shows an example of a process for reasoning based on chart question answering according to aspects of the present disclosure.

FIG. 7 shows an example of a process for reasoning based on chart question answering according to aspects of the present disclosure. The example shown in FIG. 7 includes operations similar to those previously described with reference to FIGS. 3-6, and also includes operations related to providing a user with information related to interpreting the answer (e.g., a visual indication of a chart component which served as a source of the answer).

In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 700, the system receives a text query about a chart from a user. In some cases, the operations of this step may be performed by a query component as described with reference to FIG. 8.

At operation 705, the system identifies a set of chart elements in the chart. In some cases, the operations of this step may be performed by a chart parses as described with reference to FIGS. 2 and 8.

At operation 715, the system generates an answer to the text query based on the text query with the one or more replaced text strings. In some cases, the operations of this step may be performed by an answer component as described with reference to FIGS. 2 and 8.

At operation 720, the system generates visual answer interpretation information based on an associated between the answer and the chart elements. In some cases, the operations of this step may be performed by a reasoning component as described with reference to FIGS. 2 and 8.

At operation 725, the system provides the answer and the visual answer interpretation information to the user. In some cases, the operations of this step may be performed by a reasoning component as described with reference to FIGS. 2 and 8.

Interpretable question answering may be performed when correspondences between text strings and plot elements are obtained using distance-based heuristics in the case where the labels are directly written. For example, interpretable question answering is performed on detected bars corresponding to axis labels. Alternatively, a color-based match between the plot elements and legend previews may be used if a legend is present in the chart. Interpretable question answering may enhance the presentation of various plot elements that may be involved in reasoning about the question.

The encoded answer may also be converted into its corresponding plot element if the answer is from within the chart and presented to the user. Answer text may be encoded in a dimensional vector, with one dimension each for chart text elements, chart types, yes/no/none/negative/positive and numeric values. Text elements are ordered using ground truth boxes and annotations, for the purpose of training. Thus, the answer may be encoded as a vector, where the dimensions representing the answer text have a set value as shown below with reference to Table 2.

Question Answering Apparatus

Figure 8:
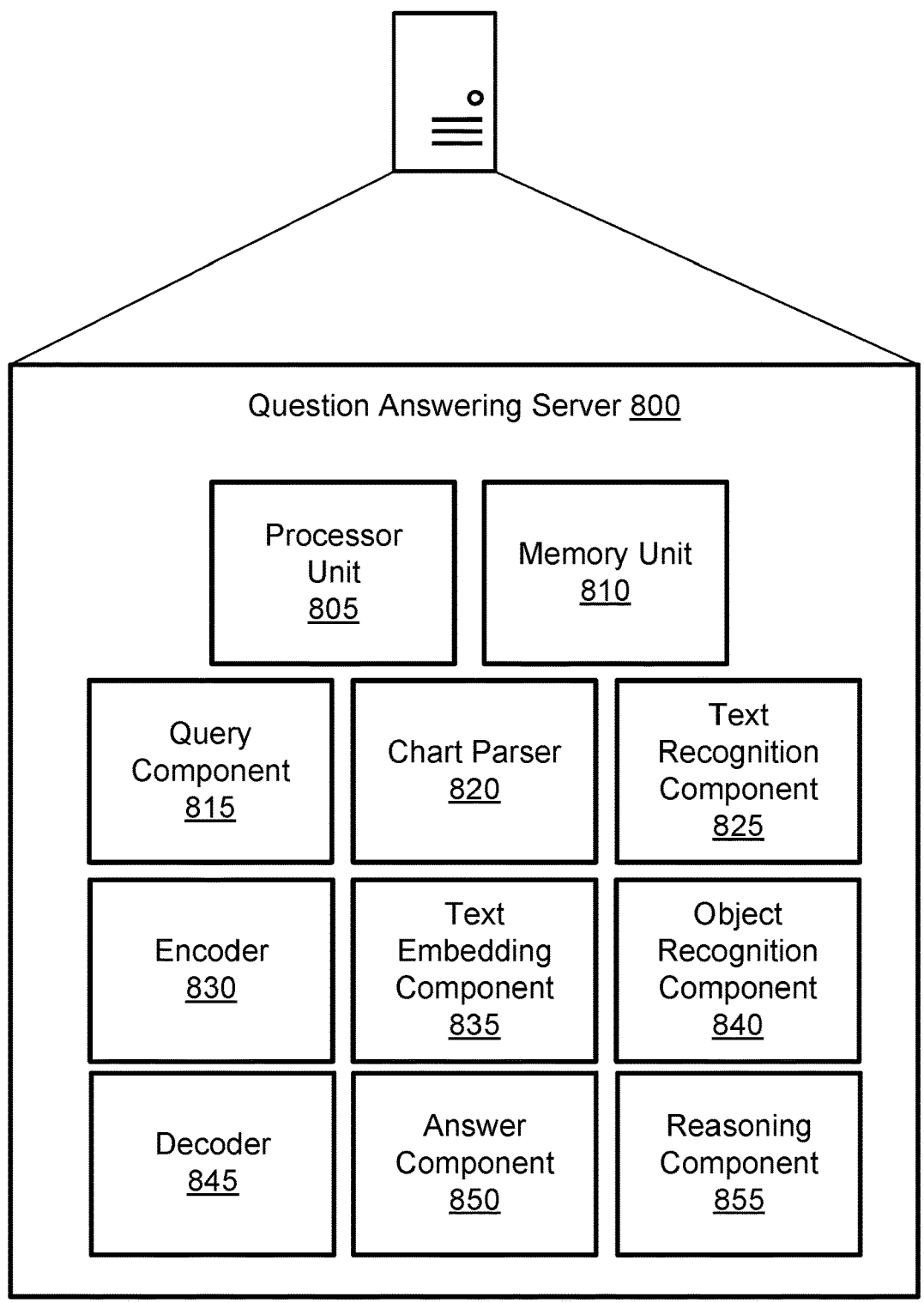
FIG. 8 shows an example of an apparatus for chart question answering according to aspects of the present disclosure.

FIG. 8 shows an example of an apparatus for chart question answering comprising a question answering server, according to aspects of the present disclosure. Question answering server 800 may include processor unit 805, memory unit 810, query component 815, chart parser 820, text recognition component 825, encoder 830, text embedding component 835, object recognition component 840, decoder 845, answer component 850, and reasoning component 855. Question answering server 800 may be an example of, or include aspects of, the corresponding element described with reference to FIG. 1.

A processor unit 805 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

A memory unit 810 may store information for various programs and applications on a computing device. For example, the storage may include data for running an operating system. The memory may include both volatile memory and non-volatile memory. Volatile memory may random access memory (RAM), and non-volatile memory may include read-only memory (ROM), flash memory, electrically erasable programmable read-only memory (EE-PROM), digital tape, a hard disk drive (HDD), and a solid state drive (SSD). Memory may include any combination of readable and/or writable volatile memories and/or non-volatile memories, along with other possible storage devices.

Question answering server 800 may include one or more artificial neural networks artificial neural networks as described above. Query component 815 may receive text queries about a chart (e.g., from a user). In some examples, the queries may also be automatically generated. In some embodiments, chart parser 820, text recognition component 825, and encoder 830 are combined into an integrated query encoder (not shown). In some examples, text embedding component 835 and object recognition component 840 may also be combined into an integrated component.

Chart parser 820, text recognition component 825, encoder 830, text embedding component 835, object recognition component 840, decoder 845, answer component 850 and reasoning component 855 may be examples of, or include aspects of, the corresponding elements described with reference to FIG. 2.

Accordingly, the present disclosure includes the following embodiments.

A method, apparatus, and non-transitory computer readable medium storing code for chart question answering is described. In some examples, the method, apparatus, and non-transitory computer readable medium may: receive a text query about a chart, identify a plurality of chart elements in the chart, associate a text string from the text query with corresponding chart elements from the plurality of chart elements, replace the text string in the text query with arbitrary rare words based on the association to produce an encoded query, generate an embedded query based on the encoded query, generate an image feature vector based on the chart, combine the embedded query and the image feature vector to produce a combined feature vector, compute an answer probability vector based on the combined feature vector, and provide an answer to the text query based on the answer probability vector.

Some examples of the method, apparatus, and non-transitory computer readable medium described above may further include detecting an element order for at least one of the chart elements, wherein the replacing the text string is based at least in part on the element order. In some examples, the plurality of chart elements are identified using a Mask Region Convolutional Neural Network (RCNN).

Some examples of the method, apparatus, and non-transitory computer readable medium described above may further include performing text recognition on the plurality of chart elements. Some examples may further include identifying the text string based on the text recognition. In some examples, the text recognition is performed using an oracle or an automated Optical Character Recognition (OCR). In some examples, the rare words comprise rarely used words from a GloVe dictionary.

In some examples, the embedded query is generated using a Long Short Term Memory (LSTM) neural network. In some examples, the image feature vector is generated using a ResNet neural network, a Spatial Attention Network (SAN), or both.

Some examples of the method, apparatus, and non-transitory computer readable medium described above may further include providing the combined feature vector to a fully connected neural network. Some examples may further include applying a softmax function, wherein the answer probability vector is computed based on the softmax function.

Some examples of the method, apparatus, and non-transitory computer readable medium described above may further include associating the dimensions of the answer probability vector with the text string, the plurality of chart elements, chart types, common answer words, or any combination thereof. In some examples, the answer is based on a dimension of the answer probability vector with a highest value.

Some examples of the method, apparatus, and non-transitory computer readable medium described above may further include identifying a chart element corresponding to the answer. Some examples may further include generating answer interpretation information based on the identified chart element.

Another method, apparatus, and non-transitory computer readable medium are described. The apparatus may include a processor, memory in electronic communication with the processor, and instructions stored in the memory. The method, apparatus, and non-transitory computer readable medium may receive a text query about a chart from a user, identify a plurality of chart elements in the chart, replace a text string in the text query with arbitrary rare words based on the chart elements, generate an answer to the text query based on the text query with the one or more replaced text strings, generate visual answer interpretation information based on an associated between the answer and the chart elements, and provide the answer and the visual answer interpretation information to the user.

Another apparatus for chart question answering are described. Embodiments of the apparatus may include a chart parser configured to identify a plurality of chart elements in the chart, a text recognition component configured to identify a text string from the plurality of chart elements, an encoder configured to replace the text string in the text query with arbitrary rare words, a text embedding component configured to generate an embedded query based at least in part on the rare words, an object recognition component configured to generate an image feature vector based on the chart, and a decoder configured to compute an answer probability vector based on the embedded query and the image feature vector.

Some examples of the apparatus described above may further include a reasoning component configured to identify one or more of the plurality of chart elements based on the answer and generate answer interpretation information.

In some examples, the chart parser comprises a mask RCNN. In some examples, the texting recognition component comprises an OCR component, an oracle component, or both. In some examples, the text embedding component comprises an LSTM neural network. In some examples, the object recognition component comprises a ResNet neural network, an SAN, or both. In some examples, the decoder comprises a fully connected neural network and a softmax function.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A computer-implemented method for image processing, comprising:
replacing a text string in a text query with an arbitrary rare word to produce an encoded query, wherein the text query relates to a chart and the text string is replaced based at least in part on an association between the text string and a chart element of the chart;
generating a combined feature vector based at least in part on the encoded query;
computing an answer probability vector based on the combined feature vector; and
providing an answer to the text query based on the answer probability vector.

2. The method of claim 1, further comprising:
receiving the text query;
identifying a plurality of chart elements including the chart element using a Mask Region Convolutional Neural Network (RCNN); and
associating the text string from the text query with the chart element.

3. The method of claim 2, further comprising:
detecting an element order for one or more of the plurality of chart elements, wherein the text string is replaced based at least in part on the element order.

4. The method of claim 1, further comprising:
generating an embedded query based on the encoded query;
generating an image feature vector based on the chart; and
combining the embedded query and the image feature vector to produce the combined feature vector.

5. The method of claim 1, further comprising:
performing text recognition on the chart element; and
identifying the text string based on the text recognition.

6. The method of claim 1, further comprising:
selecting the rare word from a GloVe dictionary.

7. The method of claim 1, further comprising:
providing the combined feature vector to a fully connected neural network; and
applying a softmax function, wherein the answer probability vector is computed based on the softmax function.

8. The method of claim 1, further comprising:
associating dimensions of the answer probability vector with elements from a set comprising the text string, a plurality of chart elements, chart types, and common answer words.

9. The method of claim 1, further comprising:
identifying a chart element corresponding to the answer; and
generating answer interpretation information based on the identified chart element.

10. A computer-implemented method for image processing, comprising:
receiving a text query about a chart, wherein the chart comprises a plurality of chart elements;
replacing at least one text string in the text query with an arbitrary rare word based at least in part on the chart elements;
generating an answer to the text query based on the text query;
generating visual answer interpretation information based on an associated between the answer and the chart elements; and
providing the answer and the visual answer interpretation information.

11. The method of claim 10, further comprising:
identifying the plurality of chart elements using a chart parser;
generating an embedded query based on the plurality of chart elements and the text query having the at least one text string replaced with the arbitrary rare word;
generating an image feature vector using an object recognition component; and
combining the embedded query and the image feature vector to produce a combined feature vector, wherein the answer is generated based at least in part on the combined feature vector.

12. The method of claim 11, further comprising:
providing the combined feature vector to a fully connected neural network; and
applying a softmax function to an output of the fully connected neural network, wherein the answer is based on an output of the softmax function.

13. A computer system for image recognition, the computer system comprising:
a chart parser configured to identify a plurality of chart elements in a chart;
an encoder configured to replace at least one text string in a text query with a rare word from a fixed word embedding dictionary;
a text embedding component configured to generate an embedded query based at least in part on the rare word; and
a decoder configured to compute an answer probability vector based on the embedded query.

14. The computer system of claim 13, further comprising:
a text recognition component configured to identify the text string from the plurality of chart elements; and
an object recognition component configured to generate an image feature vector based on the chart, wherein the answer probability vector is based at least in part on the image feature vector.

15. The computer system of claim 14, wherein the object recognition component comprises a ResNet neural network or a spatial attention network (SAN).

16. The computer system of claim 14, wherein the text recognition component comprises an optical character recognition (OCR) component or an oracle component.

17. The computer system of claim 13, further comprising:
a reasoning component configured to identify a chart element based on the answer probability vector and generate answer interpretation information based on the identified chart element.

18. The computer system of claim 13, wherein the chart parser comprises a mask Region Convolutional Neural Network (RCNN).

19. The computer system of claim 13, wherein the text embedding component comprises a long short term memory (LSTM) neural network.

20. The computer system of claim 13, wherein the decoder comprises a fully connected neural network and a softmax function.

* * * * *